May 2, 1950          J. W. GROSS          2,505,892

CARD INDEX

Filed Aug. 27, 1945          2 Sheets—Sheet 1

May 2, 1950 J. W. GROSS 2,505,892
CARD INDEX

Filed Aug. 27, 1945 2 Sheets-Sheet 2

Inventor
John W. Gross

Patented May 2, 1950

2,505,892

UNITED STATES PATENT OFFICE 2,505,892

CARD INDEX

John W. Gross, Hartford, Conn., assignor to Remington Rand Inc., Buffalo, N. Y., a corporation of Delaware Application August 27, 1945, Serial No. 612,809

3 Claims. (Cl. 129—16.7)

This invention relates to card indexes and more particularly to a visible card index having a lead time indicating means.

The purpose of the invention is to improve card indexes by providing an improved index for records in which two factors regarding each indexed item in the record may be indicated and signalled at one position in connection with the index to the recorded information. For example, in keeping a stock record, this invention provides a means for indicating in advance when material and parts stock should be ordered in order to be able to complete manufactured items for delivery at a subsequent specified time.

The invention provides a card index having indicia associated with each card and a signal for cooperation with the indicia to signal certain information in cooperation with the indicia on the card and a lead time indicator associated with the first-mentioned indicia and the signal for cooperation therewith to simultaneously indicate additional information with respect to the record on the associated card.

The invention comprehends the provision of a lead time insert or indicator for card indexes, having indicia thereon and formed with means in fixed relation to the indicia arranged to fix the position of the insert or indicator with respect to indicia on a record card with which it is associated for cooperation with the indicia on the record card to indicate additional information regarding the record on the card.

In the drawing:

Fig. 1 is a plan view of a card holder showing the assembled index cards, index indicia and signal in operative position for one item of index information arranged for use in a visible card index.

Fig. 2 is a view similar to Fig. 1 with the top cards moved into an upper position about their hinged mounting at the upper portion of the card holder so as to display the main index card and the associated indicia and signal.

Figs. 3 and 4 are views similar to Figs. 1 and 2 showing the invention arranged for indexing slightly different information from that shown in Figs. 1 and 2 but of a character that will usually be found indexed with the information shown in Figs. 1 and 2 in a single visible index.

Fig. 5 shows a title insert, signal and lead time insert of the character shown in the preceding figures arranged in the manner shown in Fig. 1 but disassembled and illustrated in perspective.

Fig. 6 is a cross-section taken on line 6—6 of Fig. 1.

This invention is illustrated in a form that is particularly adapted to use in visible card indexes and provides improvements over the index shown in Hutchings Patent 1,817,564, August 4, 1931. While the invention is illustrated in connection with a sliding signal of the type shown in Patent 1,817,564, it is to be understood that it is well adapted for use in an index employing a signal of the character shown in Rand Patent No. 1,317,643 of September 30, 1919. It will therefore be understood that while only one form of the invention is described for use in indexing stock records, that it is well adapted for use in indexing other types of records and may well be adapted, without departing from the spirit of the invention, to indexing records of various kinds where the records are filed vertically and indexed in a manner commonly used for the indexing of vertical records, as distinguished from visible indexes.

The invention as illustrated is for the indexing of stock records by a visible index system providing card holders for supporting a plurality of record cards in associated relation to receive and index the desired information.

The card holders 1, of conventional form, are provided with transparent Celluloid tips 2 on the free margin and at the opposite margin carry conventional supporting means 3 for hingedly mounting the card holder in a tray, or on a frame, or panel, for support in offset overlapping relation with a plurality of similar card holders so as to support the cards with the marginal portion supported in tip 2 in visible indexed relation in a manner well-known in the art. A main record card 4, shown in Figs. 1 to 4, has a printed form blank thereon to receive the consolidated information regarding the stock record in which the card is used. One margin of card 4 is engaged in tip 2 along the visible margin of the card holder, while the opposite corners of the card are engaged in corner slots 5 adjacent the opposite margin of the card holder, in a well-known manner. Main index card 4 has an appropriately designated section indicated at 6 entitled "Lead time—Days." This section is provided with appropriately designated lines and columns for receiving records for calculating lead time for the purchase of the item identified thereon and also for the recording of information regarding shop operations on the item.

A plurality of supplemental index cards 7 having partially printed blank forms thereon, are mounted in superimposed relation over main index card 4 for hinging movement about the upper edge of the main index card 4 through the provision of suitable attaching means engaging in the corner slots 5 of card holder 1, in a manner now well-known in the art. While several of these supplemental index cards are used in indexing the stock record illustrated in the drawings and herein described, only those cards are illustrated that show the information necessary to disclose the present invention. The cards 4 and 7 used in all of Figs. 1 to 4 are identical and the difference in the use of these cards will become apparent in the following description.

Another index card 8, hereinafter referred to as a "title insert" is constructed in the manner clearly shown in Fig. 5. This title insert 8 is folded, as shown in Fig. 5 and the fold portion is engaged in tip 2 on card holder 1 so that the front portion of the fold indicated at 9 in Fig. 5 overlies the front lower margin of main index card 4 while the rear portion of insert 8 is extended around the free margin of index card 4 and lies against the front face of the card holder. Title insert 8 is formed with transverse slots at 10 for slidably receiving signals 11 therein. The title insert 8, as illustrated in the drawings, is constructed to receive two signals 11, one extending through each slot 10. Each signal 11 has a handle portion 12 by which the signal may be slidably moved relative to title insert 8.

Each signal extends through one slot 10 in title insert 8 with the end of the signal having handle 12 in front of the upturned front fold portion 9 of the title insert so that the signal will overlie and cooperate with the indicia 13 on the visible portion 9 of the title insert. As illustrated in the drawings, handle 12 is located at the right-hand end of signal 11 and the right-hand end portion of each signal is exposed in visible relation over the indicia to the right of slot 10 through which the signal extends. The concealed portion of the signal may be extended through similar slots formed in the lower margin of record card 4 and through the back portion of title insert 8. The concealed portion of the signal may lie between the back portion of insert 8 and the card holder. The concealed portion of the signal may also be arranged to lie between the back of record card 4 and the back fold portion of title insert 8, or may be arranged in any other suitable manner so that one portion of the signal is concealed and another is exposed to view.

In assembling the index cards on the card holder, the folded insert is engaged in position in tip 2 on the card holder in a manner well-known in the art. The signals are engaged in slots 10. The record card is inserted into position with the free margin engaged in the folded portion of the insert in the manner above described, in association with the title insert and the signal. Then the supplemental record cards 7 are inserted into their proper positions on the card holder and the upper edge of record card 4 is then moved into position into the folded portions of supplemental cards 7 and the upper corners engaged in corner slots 5. This assembly of the record cards, title inserts and signal is carried out in the manner described or in some similar manner. This assembly of these parts of the index is well-known in the art.

Before the title insert is engaged in card holder 1, it has the desired index information inscribed thereon any suitable manner. In the form of the invention illustrated, title insert 8, as shown in Figs. 1 and 2, is inscribed with the part number "27213" and the indication "Purchased item" with reference to the name of the part. Any other indexing information that is needed may be used according to the type of record. The illustration in the drawings is by way of example only. Months of the year are used to provide the indicia 13 on the visible margin of title insert 8. One series of months to cover a one year period is provided on the portion of the title insert used for cooperation with each signal, the months being arranged in chronological order, as shown in the drawings.

The lead time insert providing the principal feature of the present invention, is indicated at 14 and comprises an elongated flexible strip of paper or the like, provided with indicia along one margin indicated at 15 that is a duplicate of the indicia 13 on title insert 8. The indicia 15 are duplicated on the margin of lead time insert 14 in order that in the various positions of the insert there will be twelve monthly periods arranged in adjacent registering relation with the twelve monthly periods formed by the indicia 13. The opposite margin of lead time insert 14 is provided with suitable positioning and position indicating means.

The means used for positioning the lead time insert is in the form of a plurality of transversely extending lines of perforations 16 arranged in spaced parallel relation throughout the length of the insert. These lines of perforations 16 are arranged to register exactly with the lines separating and indexing the indicia 15 on the opposite margin. Then, a series of indicia are used between the perforated lines 16 to indicate the lead time for the various positions in which insert 14 may be associated with title insert 8. For this purpose, the indicia indicated at 17 and using the numeral digits 1 to 11 inclusive, are arranged in the manner shown in Fig. 5. Indicia 17 provide a means of indicating the particular perforated line on the insert that may be used to position the insert in a lead time position.

In addition, the margin of lead time insert 14 provided with the perforated lines 16, is arranged to provide a support for the insert to engage in folded title insert 8 for positioning indicia 15 adjacent and immediately above indicia 13 on title insert 8, in the manner shown in Figs. 1 to 4. In placing a lead time insert in assembled relation in the index, the selected line of perforations is determined. In Fig. 5, the selected line of perforations is indicated by the digit 4 of indicia 17 and the lower margin has the perforations at the line 4 torn to provide a slot indicated at 18 in the margin of the lead time insert. The lead time insert strip is substantially longer than the portion of title insert 8 having the indicia 13 with which it is to be associated. Therefore, after the insert has its margin torn, as indicated at 18, it is then folded, as indicated at 19 in Fig. 5, when it is ready for insertion into the folded title insert 8. Lead time insert 14 is inserted so that slot 18 will register with slot 10 in title insert 8 with the portion to the left of slot 18 in front of signal 11 and the portion at the right of slot 18 in the rear of signal 11 in order that handle 12 will lie over the face of lead time insert 14 and register with indicia 15 thereon. Lead time insert 14 is inserted in this manner so that the margin formed with the lines of perforations will engage behind the front portion of title insert 8 and the lower edge of the lead time insert will seat in the fold portion of title insert 8. This will space the upper margin of lead time insert 14 having indicia 15 thereon in the position shown in Figs. 1 to 4. Where the insert is slotted at 18 for a four months' lead time, it will be obvious that the month forming indicia 15 on lead time insert 14 will be offset a distance of four months with relation to the duplicate month on indicia 13.

In providing a record such as disclosed by way of example in the drawings, the structural parts above described may be used to provide an efficient index and record for material and production control. The record provides a manufacturer with the necessary forms for entering actual orders that are received for the various goods that are manufactured and for the ordering of the materials and other parts necessary to manufacture these goods so that they may be completed and delivered to the customer at a promised time. Each manufactured item has the parts that go to make up the item assigned a part number. In the examples illustrated in the drawings showing two ways in which parts are obtained by a manufacturer to put into a finished product, the part number "27213" has been assigned to show how records for a part purchased from a supplier is set up and operated. Where a part is manufactured from raw materials purchased from a raw material supplier, an example of this type of record is shown in Figs. 3 and 4 and indexed by part number "27335."

It will be assumed that an order is received on Feb. 16 for a certain number of manufactured products. This order requires a supply of a product using part number 27213 and in order to supply the order, it is found that 120 of part number 27213 are required. Accordingly, as shown in Fig. 1, this order is entered under the month "Nov." in which delivery of the product is promised and the date is indicated in the "Date" column on the same line. Another order may be received March 15 for a quantity of a product that will require 80 of part number 27213. Again the delivery month is November. This is entered on the second line in the manner shown in Fig. 1. It will be noted that these entries are made on one of the secondary index cards 7 entitled "Requirement record—No. 4." This shows how entries are made in this index for the number of parts required for the production during each month, the entries described above being by way of example only and illustrating only two entries showing how requirements are determined for a one month period only. It is to be understood that many other orders may be entered in which the parts may be required during any or all of the months of the year.

In order that a sufficient number of parts No. 27213 may be obtained in sufficient time in advance of November, to supply the orders entered, it is desirable to know how far in advance these parts must be ordered from the supplier in order to receive them in sufficient time for their incorporation into the product to be supplied on the orders listed and the ordered products actually delivered to the customer. Therefore, according to the present invention, it is ascertained that the vendor takes ninety days from the time the order is sent out for the part No. 27213 until delivery is received on the order. It is also determined that approximately four days are consumed in the plant to receive and inspect purchased item number 27213 and further that it takes four days to handle the paperwork to properly place this part number in stock so that is can be used for production on an order such as those listed in Fig. 1. These figures are entered in the appropriately designated section 6 on main record card 4, as shown in Fig. 2, with the date when the determination of these time factors is made. It will be understood that these times are rechecked from time to time so that whenever the amount of time required to obtain part 27213 is greater or less than that shown on the record in appropriately designated section 6, then this time is rechecked and new entries made for the new and changed times. The total time that it takes to handle purchased item No. 27213 to make it available for production is therefore determined to be ninety-eight days, as entered in section 6 on main record card 4. Since this is greater than three months, a four months' lead time period is determined for the purpose of calculating the lead time for this part.

A lead time insert 14 is then torn along the perforated line indicated by the digit 4 of the indicia 17, as shown in Fig. 5 and the insert then folded, as shown in Fig. 5, and inserted into title insert 8 in the manner above described with slot 18 in registry with the right-hand slot 10 in title insert 8. The lead time insert is inserted into the position shown in Fig. 1 and signal 11, as shown in Fig. 1, will extend through the slot 18 in the lead time insert and provide a means for definitely positioning the lead time insert in a four months' lead time position relative to indicia 13 on title insert 8. This will position the month of June on lead time insert 15 opposite the month of February of indicia 13 on title insert 8, as shown in Fig. 1. When the right-hand end of signal 11 is moved along the indicia 13 and 15, it will indicate a month on the indicia 15, four months ahead of the month indicia for indicia 13. As a result, when signal 11 has the right-hand end moved currently from month to month throughout the year along scale 13 to show the month in which deliveries on orders should be made, it will also indicate the month on scale 15 of the lead time insert in which parts should be ordered for the supply of orders during a succeeding month.

In the case of the record disclosed in Figs. 1 and 2, the signal will indicate a month, four months in advance of the current month, on the lead time insert scale 15. The signal is shown on scale 13 at the month of May. It will be noted that it shows that the parts to be used in orders to be delivered during the month of September must be ordered in May. It will also be noted that when this signal is moved to the right, along scale 13, and reaches the month of July, it will indicate on lead time insert 14 that parts to be used in orders to be delivered in November must be ordered the first of July. Therefore, the parts listed on supplemental index card 7, shown in Fig. 1, would be ordered in July in order to obtain the parts necessary to supply the orders listed on card 7 in November.

In the case of a manufactured item, such as part No. 27335, the record is set up as shown in Figs. 3 and 4. The orders for products using manufactured items are entered in the same manner as products using purchased items, shown in Fig. 1. The orders are entered in the same manner on supplemental card 7, as illustrated in Fig. 3. Two entries have been indicated showing the number of parts required for products that must be delivered during the month of November. The entries made, as shown in Fig. 3 may be the number of parts required for assembly with the products requiring parts 27213, as indicated in Fig. 1. In this case however, it is first necessary to obtain material from a vendor, and subsequent to the receipt of the material, it is necessary to fabricate it in the manufacturer's plant. Therefore, in the case of part No. 27335, it is determined that an order for the purchase of the material requires one hundred and twenty days from the time of the purchase order until it is delivered. In addition, five days are required for receipt and inspection of the material and five days are required for the paper work, making a total of one hundred and thirty days that are consumed in obtaining the material by purchase from which part No. 27335 can be manufactured.

It is then determined that machining and paper work in the shop require thirteen days. These entries are made in the section 6 on main record card 4, as shown in Fig. 4. Then, two lead time inserts are used. One lead time insert is used to indicate the time for ordering the material and the other lead time insert is used to show the date when the shop work must start in order to finish the parts in time for use in supplying products on the orders listed for November. Therefore, the total lead time is found to be 143 days. However, it is found by experiance that it is desirable to allow some extra time so that thirty days is arbitrarily added to the total lead time which makes the lead time for the purchase of material, six months. A lead time insert 14 therefore has the perforated line 16 thereon torn at the left of the digit 6 for a six mouths' lead time period. The lead time insert then has the slot formed in the lower margin engaged over the right-hand signal, as shown in Figs. 3 and 4, so as to position the month designations in indicia scale 15, six months in advance of the corresponding indicia on scale 13. In this way, when the right hand end of signal 11, shown at the right in Figs. 3 and 4, is opposite the month of May on scale 13 of title insert 8, it will also be opposite the month of November on scale 15 of lead time insert 14 indicating that the material for November orders must be ordered the first of May so that it will be received in sufficient time to fabricate part No. 27335 for November orders.

The second lead time insert used in Figs. 3 and 4 is associated with the signal toward the left in the record, as shown. By referring to section 6 of main index card 4, it shows that the shop time is thirteen days for processing the material for part No. 27335 making it necessary to provide a one month lead time for the processing of the material for this part. Accordingly, another lead time insert has its margin torn along the perforated line 16 for the digit 1 in the scale 17 so that the slot opposite the one month lead time of insert 14 can be engaged over the left-hand signal in registry with the slot 10 through which the signal passes. As a result, the lead time insert has the month of the scale 15 thereon offset to the left of the month on scale 13 at the left-hand side in Figs. 3 and 4, only one month. In this way, when signal 11 is set for the month of May, it will indicate that on the first of May it is necessary to send the shop orders through for all parts that must be fabricated for orders to be delivered during the month of June.

An accurate control is obtained in a record of the character herein described for obtaining purchased parts, as well as producing manufactured parts so that the required number of parts for the manufacture of all products on which orders have been received can be obtained within sufficient time to deliver the orders, when promised. In this way, work stoppages may be eliminated through lack of one or more parts resulting from oversight or failure to order the required part and delay in supplying of orders is eliminated. In addition, an overstock of parts and materials requiring the use of space necessary for other purposes is also eliminated and overstock of an unnecessary number of parts and raw materials is eliminated by having a record index with the lead time insert constructed and used in accordance with the present invention.

It is to be understood that the index 13 may be applied directly to the margin of a record card, instead of to a title insert and the lead time insert may be constructed in a manner that it can be conveniently associated with such record card and held in a position such as shown in Figs. 1 to 4 for signalling cooperation between each other and with the sliding signal, as illustrated. It is also to be understood that instead of using a sliding signal, as indicated at 11, any other type of well-known signal may be used for indicating the current month on indicia scale 13 and at the same time indicating the month indicia of scale 15 on the lead time insert to obtain the indication of the lead time for ordering materials and parts in the manner described above. It will be further understood that while this invention has been disclosed for use in connection with a stock record and material order index, that it may have other applications in which a lead time insert could be used with a suitable scale along one margin for signalling cooperation with the scale on the margin of a record card in cooperation with a signal or the like to provide a dual indication of suitable information where this dual signalling of information is advantageous in the operation of an index for other purposes than stock records.

The invention claimed is:

1. In a card index wherein a card holder has a visible free margin carrying a transparent sheath, a title insert engaged in said sheath and having a slot intermediate its ends with a signal of elongated strip form slidably engaged in said sheath and extending through said slot to conceal one portion of the signal behind the insert while the exposed end of the signal cooperates with a scale formed on and extending along the visible margin of the insert, said scale showing months of the year in successive order and said signal having a portion extending above said title insert and sheath, the combination of a lead time insert formed of an elongated strip having a duplicate scale on one margin thereof to said scale on the title insert and having the opposite margin formed with a plurality of transversely extending partially perforated lines along which said margin may be slotted arranged in registering relation with the scale on the opposite margin thereof, and indicia individualizing the portions of said last-mentioned margin between said lines of perforations for indicating the perforated line position for tearing said margin to provide a slot for a given lead time whereby said lead time insert may be inserted with said slotted margin behind said title insert with the slot receiving said signal therein in registry with the slot in said title insert so the scale on the margin of said lead time insert will have the indicia thereon corresponding to the said indicia on the title insert offset longitudinally relative thereto an amount equal to the lead time indicia where said perforated margin is slotted.

2. In a card index having an index card having a slot in a margin thereof, a signal formed of an elongated strip, indicia on said card margin, means on one margin of said card for detachably mounting said signal thereon for slidable signalling cooperation with said indicia on said card margin and with said signal extending through said slot in said margin, the combination of a lead time insert strip having duplicate indicia to the indicia on the card margin repeated thereon in serial order along one margin, and positioning means along the opposite margin of said strip forming selective slotting portions in corresponding positions to the indicia on said strip for positioning said strip by means of a slot at one of said slotting portions receiving said signal to position the indicia on said strip adjacent cooperative relation with the indicia on said card margin and said signal and with corresponding indicia offset an amount determined by the position of said slot in said insert strip.

3. In a card index having an index card, indicia on a margin thereof, a signal of elongated strip form, and means on one margin of said card for slidably mounting said signal thereon with a portion exposed and another portion concealed, the exposed portion being variable by sliding of the signal for signalling cooperation with said indicia on the margin of said card, the combination of a lead time insert strip having duplicate indicia to the indicia on the card margin repeated thereon in serial order along one margin, and tabs on the opposite margin of said strip forming selective positioning portions for the indicia on said strip and selective engagement over opposite sides of said signal in registry with said first-mentioned means for positioning said insert with the indicia thereon in adjacent cooperative relation with the indicia on said card and said signal and with corresponding indicia offset an amount determined by said tab engagement with said signal.

JOHN W. GROSS.

REFERENCES CITED

The following references are of record in the file of this patent:

UNITED STATES PATENTS

| Number | Name | Date |
| --- | --- | --- |
| 403,939 | Keller | May 28, 1889 |
| 1,423,473 | Taylor et al. | July 1922 |
| 2,006,945 | Doble | July 2, 1935 |
| 2,370,074 | Roscoe | Feb. 20, 1945 |